United States Patent

Ohashi et al.

[11] Patent Number: 5,516,833
[45] Date of Patent: May 14, 1996

[54] RUBBER COMPOSITION

[75] Inventors: Masayuki Ohashi; Hiroshi Yamada; Tomohiro Kusano, all of Tokyo, Japan

[73] Assignee: Bridgestone Corporation, Tokyo, Japan

[21] Appl. No.: 139,790

[22] Filed: Oct. 22, 1993

[30] Foreign Application Priority Data

Oct. 23, 1992 [JP] Japan .................................. 4-286047

[51] Int. Cl.⁶ ........................................................ C08K 3/04
[52] U.S. Cl. ........................ 524/495; 524/496; 524/570; 524/571
[58] Field of Search ............................... 525/89; 524/495, 524/496, 570, 571

[56] References Cited

U.S. PATENT DOCUMENTS

| | | | |
|---|---|---|---|
| 4,360,627 | 11/1982 | Okado et al. | 524/496 |
| 4,433,094 | 2/1984 | Ogawa et al. | 524/496 |
| 4,477,621 | 10/1984 | Sato et al. | 524/496 |
| 4,478,973 | 10/1984 | Misono et al. | 524/496 |
| 4,540,560 | 9/1985 | Henderson et al. | 423/445 |
| 4,678,830 | 7/1987 | Sato et al. | 524/495 |
| 4,748,199 | 5/1988 | Takiguchi et al. | 524/318 |
| 4,784,695 | 11/1988 | Mito et al. | 106/472 |
| 4,942,197 | 7/1990 | Yoshida et al. | 524/496 |
| 5,059,408 | 10/1991 | Mito | 423/445 |
| 5,069,892 | 12/1991 | Nakai | 423/445 |
| 5,179,154 | 1/1993 | Muraki et al. | 524/496 |
| 5,202,373 | 4/1993 | Kawakumi et al. | 524/495 |
| 5,225,475 | 7/1993 | Misono | 524/496 |
| 5,230,878 | 7/1993 | Nakai et al. | 423/449.1 |
| 5,231,129 | 7/1993 | Misono | 524/496 |

OTHER PUBLICATIONS

*Encyclopedia of Polymer Science and Engineering*, vol. 2, pp. 623–640, John Wiley & Sons, 1985.

*Primary Examiner*—W. Robinson H. Clark
*Attorney, Agent, or Firm*—Sughrue, Mion, Zinn, Macpeak & Seas

[57] ABSTRACT

A rubber composition contains 100 parts by weight of natural rubber and/or a diene type synthetic rubber and 20–70 parts by weight of carbon black having the following characteristics:

(1) $N_2SA$: 70~145 $m^2/gr$;
(2) DBP: 160~200 ml/100gr;
(3) 24M4DBP: 130~150 ml/100gr;
(4) DBP-24M4DBP=$\Delta$DBP$\leq$1.25×DBP−172.5;
(5) $N_2SA/IA$: 1.1~1.4; and
(6) $\Delta D_{50}$/dst: 0.50~0.80.

10 Claims, 1 Drawing Sheet

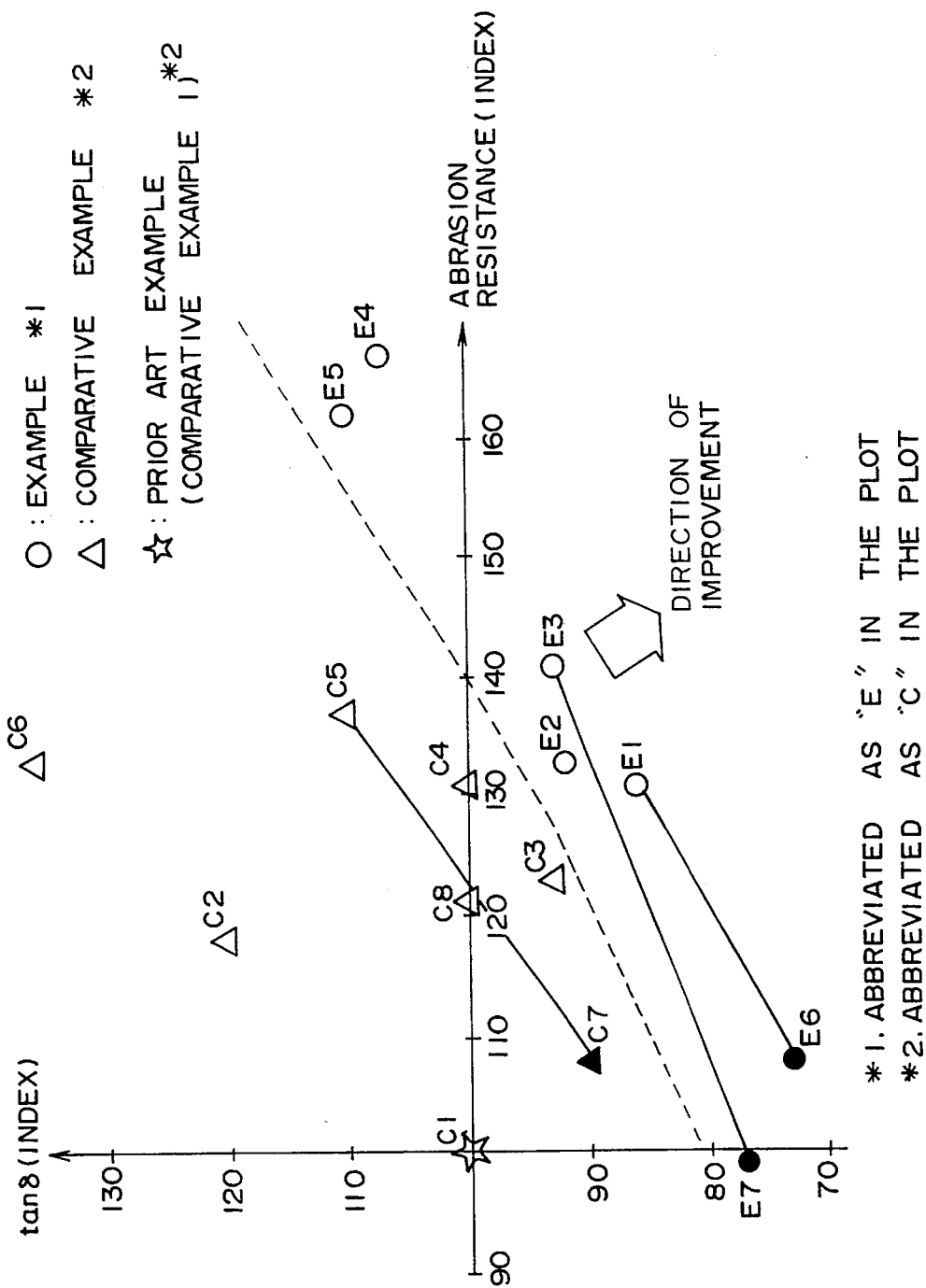

RUBBER COMPOSITION

BACKGROUND OF THE INVENTION

1. Field of the Invention

The present invention relates to a rubber composition having an excellent abrasion resistance and an excellent low heat generation property.

2. Description of the Background

Heretofore, in order to obtain a low heat generation property in a rubber composition, certain techniques have been employed, such as (1) using a low reinforcing carbon black having a low specific surface area as the carbon black, and (2) decreasing the compounding ratio of the carbon black.

On the other hand, in order to improve the abrasion resistance, other techniques have been employed, such as (1) using a high reinforcing carbon black having a high specific surface area as the carbon black, and (2) increasing the compounding ratio of the carbon black. Since these techniques are contradictory to one another, there has been a problem that the abrasion resistance is lowered when the low heat generation property is retained, and the low heat generation property is deteriorated when the abrasion resistance is improved.

As mentioned above, it has not been possible to make the two characteristics compatible by conventional means, and it has been desired to develop a rubber composition possessing both characteristics.

Japanese Patent Application Laid-Open No. Hei 3-50249 discloses a rubber composition having both high resilience and abrasion resistance which comprises 100 parts by weight of a rubber component and 30–100 parts by weight of carbon black belonging to a hard system region in which the nitrogen adsorption specific surface area ($N_2SA$) is 58–139 $m^2/g$ and the DBP oil absorption amount is 90–150 ml/100 g and having a selective characteristic that the gap size among particles $D_p$ (nm) determined by a mercury porosimetry is a value calculated by the following formula, or more.

$$\{-0.22 \times (N_2SA) + 60.8\} \quad \text{(Formula 2)}$$

However, this rubber composition is by no means satisfactory.

SUMMARY OF THE INVENTION

In view of the above-described problems, an object of the present invention is to provide a rubber composition having an excellent abrasion resistance and an excellent low heat generation property.

The present inventors have studied the colloidal characteristics of carbon blacks and found that over a certain range of a specific surface area, low heat generation property and abrasion resistance can be improved simultaneously by increasing structural size and strength and by defining a specific range of surface activation and aggregate distribution.

Thus, the present invention is as follows:

a rubber composition which comprises 100 parts by weight of at least one rubber component selected from the group consisting of natural rubber and diene synthetic rubbers and 20–70 parts by weight of carbon black meeting the following six conditions:

(i) nitrogen adsorption specific surface area ($N_2SA$)

$N_2SA=70-145$ $m^2/gr$;

(ii) dibutyl phthalate oil absorption amount (DBP)

DBP=160–200 ml/100gr;

(iii) compressed dibutyl phthalate oil absorption amount (24M4DBP)

24M4DBP=130–150 ml/100gr;

(iv) DBP oil absorption amount difference by compression ($\Delta DBP=DBP-24M4DBP$)

$\Delta DBP \leq 1.25 \times DBP - 172.5$;

(v) $N_2SA/IA$ (wherein IA: iodine adsorption specific surface area)

$N_2SA/IA=1.1-1.4$; and (vi) ratio of half width of aggregate distribution ($\Delta D_{50}$) to most probable value of aggregate distribution (dst)

$\Delta D_{50}/dst=0.50-0.80$.

In an embodiment of the present invention, styrene-butadiene copolymer synthetic rubber is present in an amount of at least 10 parts by weight.

BRIEF DESCRIPTION OF THE DRAWINGS

In FIG. 1, in which the abrasion resistance is plotted as the abscissa and the tan δ is plotted as the ordinate, there are plotted data of the rubber compositions of the Examples and Comparative Examples.

DESCRIPTION OF THE PREFERRED EMBODIMENTS

The present invention is explained in greater detail hereafter.

According to the present invention, DBP preferably ranges from 165 to 190 ml/100 gr, more preferably from 170 to 185 ml/100 gr.

Also, it is preferred that $\Delta D_{50}$ ranges from 0.55 to 0.75.

In addition, it is preferred that $N_2SA/IA$ ranges from 1.15 to 1.25.

As a diene type synthetic rubber suitable for the present invention, there may be mentioned styrene-butadiene rubber (SBR), isoprene rubber (IR), butadiene rubber (BR) and the like.

Further, the carbon black of the present invention may be produced by using a raw material having a high content of aromatic components and subjecting the raw material to a conventional oil-furnace method using a reaction furnace under a controlled formation reaction temperature, reaction time, combustion gas flow rate, raw material oil concentration at a choke portion and the like.

It should be noted that, if necessary, there may be compounded into the rubber composition of the present invention compounding ingredients which are employed conventionally in the rubber industry, such as vulcanizing agents, vulcanization accelerators, vulcanization accelerator auxiliaries, antioxidants, softeners and the like.

According to the present invention, the carbon black compounded needs to possess the above-mentioned characteristics (i)–(vi).

With respect to $N_2SA$, when the value is less than 70 m²/gr, the reinforcement property can not be effectively improved. On the other hand, when the value exceeds 145 m²/gr, a low heat generation property deteriorates.

Regarding DBP, when the value is less than 160 ml/100 gr, the balance between the reinforcement property and the low heat generation property can not be improved sufficiently. On the other hand, when the value exceeds 200 ml/100 gr, the workability of the composition deteriorates markedly.

With regard to 24M4DBP, since the value is considered to indicate structural strength, it is hard to conclude that the strong structure develops sufficiently unless DBP increases with 24M4DBP.

Therefore, when 24M4DBP is less than 130 ml/100 gr, the balance between the reinforcement property and the low heat generation property can not be improved sufficiently. On the other hand, when 24M4DBP exceeds 150 ml/100 gr, the workability of the composition deteriorates markedly.

Concerning $\Delta DBP$, the value, which is defined by DBP−24M4DBP, is the amount of a weak structure portion. The larger the value, the more the structure which is ground during kneading. The heat generation property does not decrease sufficiently due to an increase in these fine particles. Therefore, ADBP needs to meet the following formula:

$$\Delta DBP \leq 1.25 \times DBP - 172.5$$

With respect to $N_2SA/IA$, when the value is less than 1.1, the surface activity of carbon black is not sufficient. Consequently, since the interaction between the polymer and the carbon black becomes weak, the amount of carbon black gel decreases, and the reinforcement property deteriorates. Also, the low heat generation property is inferior. On the other hand, when the value exceeds 1.4, the workability of the composition deteriorates markedly.

Regarding $\Delta D_{50}/dst$, when the value is less than 0.50, the low heat generation property deteriorates, and when the value exceeds 0.80, the deterioration of the abrasion resistance becomes large.

As far as a rubber composition of the present invention is concerned, it is necessary to compound 100 parts by weight of rubber components and 20~70 parts by weight, preferably 25~55 parts by weight of the carbon black possessing the above-mentioned characteristic requirement (i)–(vi).

With carbon black at less than 20 parts by weight, the reinforcement property can not be sufficiently retained, while with carbon black exceeding 70 parts by weight, the workability deteriorates.

It is preferable that 100 parts by weight of the rubber used in the present invention contains at least 10 parts by weight of styrene-butadiene copolymer synthetic rubber. This is to improve the fatigue resistance of the rubber composition. As described above, the rubber composition according to the present invention, which contains the carbon black having a specifically limited property, has an excellent abrasion resistance and an excellent low heat generation property and can be effectively used as a rubber for tire, particularly as a tire tread rubber, and further can be used industrial rubber articles, such as a conveyor belt, hose and the like.

In particular, the rubber composition of the present invention may be used as the material for the preparation of a tire tread. Such preparation may be accomplished by the methods, materials and techniques disclosed in U.S. Patents 4,387,756 and 4,387,757, the disclosure of those patents being incorporated herein by reference.

The present invention is explained in greater detail hereinafter by reference to specific examples, but the invention is not to be construed as being limited by the following examples.

EXAMPLE

Examples 1–7, Comparative Examples 1–7

In the present example, the measurement methods of each physical property are as follows:

$N_2SA$ was based on ASTM D3037–88;

IA and DBP were based on JIS K6221; and

24M4DBP was based on ASTM D3493.

The aggregation distribution of the carbon blacks was measured by a centrifugal sedimentation method using the disk centrifuge apparatus (DCF) manufactured by Joyce Leoble company. The measurement was carried out by the following procedure. First, the carbon blacks dried (CB) were weighed precisely and were mixed with a 20% ethanol aqueous solution containing a small amount of a surface-active agent in order to prepare a dispersion solution of CB concentration of 50 mg/l. The dispersion solution was dispersed sufficiently by supersonic waves, and then the solution was used as a sample solution. The revolution of the DCF was set at 6000 rpm, and after adding 10 ml of a spin solution (distilled water), 1 ml of a buffer solution (20% ethanol aqueous solution) was injected.

Next, after injecting 0.5 ml of the sample with a syringe, the centrifugal sedimentation was begun all together, and the aggregate distribution curve was prepared by a photoelectric sedimentation method.

The stokes diameter of the largest frequency according to the curve was defined as dst.

Also, the difference between the two points, i.e., the largest and the smallest at a half of the largest frequency was defined as $\Delta D_{50}$.

The viscoelasticity measurement was carried out using a mechanical spectrometer manufactured by Iwamoto Seisakusho K.K., and the tan δ was measured under the following conditions: 60° C., frequency of 50 Hz, dynamic strain of 1%, and static load of 160 gr. The results were indicated with index, while the index of the prior art example was assumed to be 100.

The smaller the viscosity index value, the better the result.

The abrasion resistance measurement was carried out using a BS Lambourn abrasion test machine manufactured by Iwamoto Seisakusho K.K. under the condition of the slip ratio of 60% and 25%. After averaging the results obtained at 60% and 25%, the results were indicated with index, while the index of the prior art example was assumed to be 100.

The larger the abrasion resistance index value, the better the result.

The carbon black used in the present invention can be prepared, for example, by the following procedure.

As a raw material oil and a fuel fluid for producing carbon black used in the present invention, there was used a high aromatic material having the properties and composition shown in Table 1 below.

TABLE 1

| Specific gravity (JIS K2249) | (15/4° C.) | 1.1310 | Distillation Characteristic (°C.) I.B.P. 202 |
|---|---|---|---|
| Kinematic viscosity (JIS K2283) | (cst at 50° C.) | 16.8 | (Initial boiling Point) |

TABLE 1-continued

| Water content (JIS K2275) | (%) | 0.3 | 10% | 239 |
|---|---|---|---|---|
| Residual carbon (JIS K2270) | (%) | 9.5 | 30% | 292 |
| Sulfur content (JIS K2273) | (%) | 0.5 | 50% | 339 |
| Carbon amount | (%) | 90.2 | | |
| Hydrogen amount | (%) | 5.4 | | |
| BMCI | (%) | 160 | | |

*BMCI: Bureau of Mines Correlation Index

Carbon blacks used in the present invention and carbon blacks used for comparison were produced by means of a carbon black production apparatus wholly covered with refractory which comprises, a cylindrical chamber for introducing a combustible fluid for generating a high temperature combustion gas and an oxygen-containing gas fluid, a cylinder for introducing an oxygen-containing gas having a diameter smaller than and connected coaxially with the downstream portion of the above-mentioned cylindrical chamber, a plurality of radial straightening vanes mounted on the outer peripheral portion of the above-mentioned cylinder, a combustion gas converging chamber the upstream end of which is connected with the above-mentioned cylindrical chamber for introducing a combustible fluid and the downstream and which gradually converges toward the downstream side, a raw material oil introducing chamber situated at the downstream side of the above-mentioned combustion gas converging chamber and having at least one flat plane provided with a plurality of raw material oil spraying devices, a large-diameter cylindrical reaction chamber connected with the downstream end of the raw material oil introducing chamber and having a diameter larger than the diameter of the downstream end, a reaction-continuing and quenching chamber connected with the above-mentioned large-diameter cylindrical reaction chamber and provided with a plurality of removably inserted cooling water-pressurizing spraying devices, and a smoke duct connected with the rear end of the above-mentioned reaction-continuing and quenching chamber.

The physical and chemical characteristics of carbon black of the present invention and carbon black for comparison were controlled as shown below.

First, the surface area was controlled by adjusting the ratio of the introduced amount of raw fuel and air, and the surface area can be increased by increasing the amount of the introduced air.

The $N_2SA/IA$ can be controlled by adjusting the position at which the carbon black producing reaction is stopped, that is, the position at which the cooling water-pressurizing spraying device fitted to the reaction-continuing and quenching chamber is used.

The value of $N_2SA/IA$ can be increased by using the device located at the upstream side.

The DBP oil absorption amount can be controlled mainly by selecting the raw material oil introducing position, that is, the position at which the flat plane for introducing the raw material oil is used, a plurality of flat planes being provided.

DBP oil absorption amount can be increased by introducing the raw material oil to the upstream side of the combustion gas converging chamber, that is, a position near the raw material oil introducing chamber.

Controlling another structure characteristic, that is, $\Delta DBP$, can be made such that $\Delta DBP$ is decreased by introducing the raw material oil at the upstream portion. As an auxiliary means, controlling the amount of the introduced fuel can also adjust $\Delta DBP$.

Further, the aggregate characteristic of carbon black, that is, $\Delta D_{50}/dst$, can be controlled by adjusting the spraying state of the introduced raw material oil. When the pressure and temperature of the raw material oil are lowered, the spraying state deteriorates and as a result, the value of $\Delta D_{50}$ increases causing a high $\Delta D_{50}/dst$.

In conformity with various factors of the present invention, the carbon black of the present invention and the carbon black for comparison were produced by combining the above-mentioned manufacturing conditions.

The manufacturing conditions and physical and chemical characteristics of carbon black are summarized in Table 2 and Table 3. Comparison Example F is a conventional HAF grade, high structure carbon black (N339 grade: trade name, "Seast KH", manufactured by Tokai Carbon K K.).

TABLE 2

| | Manufacturing Conditions | | | | | | | | | | |
|---|---|---|---|---|---|---|---|---|---|---|---|
| | Manufacturing Example | | | | | | | | | | |
| Manufacturing | Example | | | | | Comparative Example | | | | | |
| Conditions | A | B | C | D | E | F[1] | G | H | I | J | K |
| Amount of raw material oil fed (l/h) | 572 | 523 | 427 | 357 | 303 | 427 | 427 | 373 | 502 | 512 | |
| Spraying pressure of raw material oil (kg/cm$^2$) | 25 | 25 | 25 | 25 | 25 | 15 | 25 | 25 | 25 | 25 | |
| Raw material oil-introducing position (mm) (distance from the upstream end of reactor) | 500 | 500 | 500 | 500 | 500 | 200 | 400 | 400 | 500 | 200 | |
| Number of spraying nozzle for raw material oil | 4 | 4 | 4 | 4 | 4 | 4 | 4 | 4 | 4 | 4 | |
| Preheating temperature of raw material oil (°C.) | 200 | 200 | 200 | 200 | 200 | 150 | 200 | 200 | 200 | 200 | |

TABLE 2-continued

| Manufacturing Conditions | | | | | | | | | | | |
|---|---|---|---|---|---|---|---|---|---|---|---|
| | Manufacturing Example | | | | | | | | | | |
| | Example | | | | | | Comparative Example | | | | |
| Manufacturing Conditions | A | B | C | D | E | F[1] | G | H | I | J | K |
| Amount of introduced fuel oil (kg/h) | 92 | 92 | 92 | 92 | 92 | | 92 | 92 | 94 | 99 | 70 |
| Amount of introduced air (kg/h) | 2300 | 2300 | 2300 | 2300 | 2300 | | 2300 | 2300 | 2300 | 2300 | 2300 |
| Air temperature (°C.) | 600 | 600 | 600 | 600 | 600 | | 600 | 600 | 600 | 600 | 600 |
| Cooling water introducing position (mm) (Distance from the raw material oil introducing position) | 2100 | 1300 | 1300 | 1150 | 900 | | 1500 | 5900 | 1850 | 3100 | 1400 |

Note:
[1] Carbon Black F: N339 Carbon black (trade name: Seast KH, manufactured by Tokai Carbon K.K.)

Table 3 shows the characteristic values of the carbon blacks in the Examples and the Comparative Examples.

TABLE 3

| CB characteristic value Range in claim Code of CB | | $N_2SA$ 70 ~ 145 | DBP 160 ~ 200 | 24M4DBP 130 ~ 150 | ΔDBP ≦1.25DBP − 172.5 | $N_2SA/IA$ 1.1 ~ 1.4 | $\Delta D_{50}/dst$ 0.50 ~ 0.80 |
|---|---|---|---|---|---|---|---|
| Example | A | 80 | 185 | 135 | 50 < 58.8 | 1.23 | 0.74 |
| | B | 85 | 177 | 135 | 42 < 48.8 | 1.29 | 0.62 |
| | C | 106 | 174 | 138 | 36 < 45.0 | 1.22 | 0.73 |
| | D | 126 | 173 | 135 | 38 < 43.8 | 1.13 | 0.66 |
| | E | 142 | 168 | 137 | 31 < 37.5 | 1.18 | 0.74 |
| Comparative Example | F*[1] | 93 | _119_ | _100_ | _19_ > −23.8 | _1.03_ | 0.72 |
| | G | 110 | _120_ | _102_ | _18_ > −22.5 | 1.10 | _0.92_ |
| | H | 81 | 183 | _118_ | _65_ > 56.3 | _1.04_ | 0.74 |
| | I | 91 | 171 | _119_ | _52_ > 41.3 | 1.11 | 0.71 |
| | J | 121 | 176 | 132 | 44 < 47.5 | _0.99_ | 0.72 |
| | K | _146_ | _120_ | _103_ | _17_ > −22.5 | _1.01_ | 0.75 |

(Note)
(1) *[1] Carbon Black F: Seast KH manufactured by Tokai Carbon K.K. (Prior art example)
(2) Underline: Characteristic value outside the range recited in claim The five species of the carbon black codes A~E are the carbon blacks falling under the present invention, and the six species of F~K were the carbon blacks employed in the comparative examples.

The basic compounding contents of the rubber compositions of the Examples and the Comparative Examples are as follows:

| | |
|---|---|
| natural rubber | 40 parts by weight |
| styrene-butadiene rubber (*1) | 60 parts by weight |
| carbon black | 45, 40, 35 parts by weight |
| stearic acid | 3 parts by weight |
| ZnO | 5 parts by weight |
| antioxidant 6C (*2) | 2 parts by weight |
| vulcanization accelerator CZ (*3) | 0.6 parts by weight |
| sulfur | 1.5 parts by weight | where *1: made by Japan Synethetic Rubber Co., trade name SL552
*2: N-(1,3 dimethyl-butyl)-N'-phenyl-p-phenylenediamine
*3: N-cyclomethyl-2-benzothiazylsulfenamide Table 4 shows the rubber compositions of the Examples and the Comparative Examples of the present invention using various carbon black compounding amounts, the tan δ index

TABLE 4

| | CB used | CB amount (part by weight) | Tan δ index | Abrasion resistance index |
|---|---|---|---|---|
| Comparative *1 Example 1 (Control) | F | 45 | 100 | 100 |
| Example 1 | A | 45 | 86 | 131 |
| Example 2 | B | 45 | 92 | 133 |
| Example 3 | C | 45 | 93 | 141 |
| Example 4 | D | 45 | 107 | 167 |
| Example 5 | E | 45 | 110 | 162 |
| Comparative Example 2 | G | 45 | 120 | 118 |
| Comparative Example 3 | H | 45 | 93 | 123 |
| Comparative Example 4 | I | 45 | 100 | 131 |
| Comparative Example 5 | J | 45 | 110 | 137 |
| Comparative Example 6 | K | 45 | 133 | 136 |
| Example 6 | A | 40 | 73 | 108 |
| Comparative Example 8 | J | 40 | 100 | 121 |
| Example 7 | C | 35 | 77 | 99 |

TABLE 4-continued

| CB used | CB amount (part by weight) | Tan δ index | Abrasion resistance index |
|---|---|---|---|
| Comparative Example 7 | J | 35 | 90 | 108 |

*1: Comparative Example 1 using Carbon Black F (Seast KH) is a prior art example (control)

The results of Table 4 are shown in FIG. 1 where the abrasion resistance is plotted as abscissa and the tan δ is plotted as ordinate. The lower right side direction from the dotted line in the figure is preferable.

As the tan δ becomes larger, the abrasion resistance tends to increase. However, the examples show that abrasion resistance is increased with suppression of an increase in tan δ.

In Examples 6 and 7, the reason that the abrasion resistance is low is attributed to the small filling amount of the carbon blacks.

The balance between the abrasion resistance and the tan δ is important. In Example 6 and Comparative Example 8, 40 parts by weight of each of the carbon blacks is filled up. In Example 6 the tan δ is decreased, while the abrasion resistance is at almost the same level as the control. In contrast, although the abrasion resistance of Comparative Example 8 is larger than that of the control, the tan δ becomes rather large., In each of Example 7 and Comparative Example 7, 35 parts by weight of the carbon blacks is filled up. In Example 7, the tan δ is decreased markedly with decreasing the abrasion resistance to almost the same level as the control. On the other hand, in Comparative Example 7 the abrasion resistance is slightly larger than that of the control, but lower than those of the other Examples, and the tan δ is rather lowered slightly.

As is clear from Table 4 and FIG. 1, a rubber composition which is compounded the carbon black having the characteristic values of the present invention possesses both good abrasion resistance and a low heat generation property.

What is claimed is:

1. A rubber composition which comprises 100 parts by weight of at least one rubber component selected from the group consisting of natural rubber and diene synthetic rubbers and 20–70 parts by weight of carbon black having the following characteristics:

(1) a nitrogen adsorption specific surface area ($N_2SA$) of $$70\text{--}145 \text{ m}^2/\text{g};$$

(2) a dibutyl phthalate oil absorption amount (DBP) of $$160\text{--}200 \text{ ml/100g};$$

(3) a compressed dibutyl phthalate oil absorption amount (24M4DBP) of $$130\text{--}150 \text{ ml/100g};$$

(4) a $\Delta$DBP, which is represented by DBP−24M4DBP, satisfying the following Formula 1:

$$\Delta DBP \leq (1.25 \times DBP) - 172.5; \quad \text{(Formula 1)}$$

(5) a nitrogen adsorption specific surface area/iodine adsorption specific surface area of $$(N_2SA/IA) \ 1.1\text{--}1.4; \text{ and}$$

(6) a half width of aggregate distribution/most probable value of aggregate distribution of $$(\Delta D_{50}/dst) \ 0.50\text{--}0.80.$$

2. The rubber composition according to claim 1, wherein styrene-butadiene copolymer synthetic rubber is present in an amount of at least 10 parts by weight.

3. The rubber composition according to claim 1, wherein DBP is from 165 to 190 ml/100 g.

4. The rubber composition according to claim 1, wherein DBP is from 170 to 185 ml/100 g.

5. The rubber composition according to claim 1, wherein $\Delta D_{50}$ is from 0.55 to 0.75.

6. The rubber composition according to claim 1, wherein $N_2SA/IA$ is from 1.15 to 1.25.

7. The rubber composition according to claim 1, wherein DBP is from 165 to 190 ml/100 g, $\Delta D_{50}$ is from 0.55 to 0.75, and $N_2SA/IA$ is from 1.15 to 1.25.

8. The rubber composition according to claim 1, wherein DBP is from 170 to 185 ml/100 g, $\Delta D_{50}$ is from 0.55 to 0.75, and $N_2SA/IA$ is from 1.15 to 1.25.

9. The rubber composition according to claim 1, wherein the carbon black is present in an amount of 25 to 55 parts by weight.

10. A tread for tire comprising, a rubber composition which comprises 100 parts by weight of at least one rubber component selected from the group consisting of natural rubber and diene synthetic rubbers and 20–70 parts by weight of carbon black having the following characteristics:

(1) a nitrogen adsorption specific surface area ($N_2SA$) of $$70\text{--}145 \text{ m}^2/\text{g};$$

(2) a dibutyl phthalate oil absorption amount (DBP) of $$160\text{--}200\text{ml}/100\text{gr};$$

(3) a compressed dibutyl phthalate oil absorption amount (24M4DBP) of $$130\text{--}150 \text{ ml/100g};$$

(4) a $\Delta$DBP, which is represented by DBP−24M4DBP, satisfying the following Formula 1:

$$\Delta DBP \leq (1.25 \times DBP) - 172.5; \quad \text{(Formula 1)}$$

(5) a nitrogen adsorption specific surface area/iodine adsorption specific surface area of ($N_2SA/IA$) 1.1~1.4; and (6) a half width of aggregate distribution/most probable value of aggregate distribution of ($\Delta D_{50}/dst$) 0.50~0.80.

* * * * *